(12) United States Patent
Senarath et al.

(10) Patent No.: US 11,051,183 B2
(45) Date of Patent: Jun. 29, 2021

(54) SERVICE PROVISION STEPS USING SLICES AND ASSOCIATED DEFINITIONS

(71) Applicants: Nimal Gamini Senarath, Ottawa (CA); Chengchao Liang, Ottawa (CA)

(72) Inventors: Nimal Gamini Senarath, Ottawa (CA); Chengchao Liang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 15/972,618

(22) Filed: May 7, 2018

(65) Prior Publication Data

US 2018/0332485 A1    Nov. 15, 2018

Related U.S. Application Data

(60) Provisional application No. 62/504,452, filed on May 10, 2017.

(51) Int. Cl.
| | |
|---|---|
| *H04W 24/02* | (2009.01) |
| *H04W 16/02* | (2009.01) |
| *H04W 28/24* | (2009.01) |
| *H04L 12/24* | (2006.01) |

(52) U.S. Cl.
CPC ........... *H04W 24/02* (2013.01); *H04L 41/044* (2013.01); *H04L 41/5041* (2013.01); *H04W 16/02* (2013.01); *H04W 28/24* (2013.01); *H04L 41/0843* (2013.01)

(58) Field of Classification Search
CPC ..... H04W 24/02; H04W 28/24; H04W 16/02; H04L 41/5041; H04L 41/044; H04L 41/0843; H04L 41/50; G06F 9/45558; G06F 2009/45595; G06F 9/45533
See application file for complete search history.

(56) References Cited

U.S. PATENT DOCUMENTS

| | | | |
|---|---|---|---|
| 2015/0180736 A1* | 6/2015 | Leung | H04L 41/5006 709/226 |
| 2015/0381435 A1* | 12/2015 | Todd | H04L 67/10 709/223 |
| 2016/0057209 A1* | 2/2016 | Parikh | H04L 67/10 709/203 |
| 2016/0212016 A1 | 7/2016 | Vrzic et al. | |
| 2017/0070892 A1* | 3/2017 | Song | H04L 41/042 |
| 2017/0164187 A1* | 6/2017 | Lu | H04W 8/24 |

(Continued)

FOREIGN PATENT DOCUMENTS

| | | |
|---|---|---|
| CN | 106549806 A | 3/2017 |
| CN | 106572516 A | 4/2017 |
| CN | 106572517 A | 4/2017 |

OTHER PUBLICATIONS

Yallapragada et al., Network Slicing for 5G Networks & Services, Nov. 2016, 5G Americas, pp. 1-34, (Year: 2016).*

(Continued)

*Primary Examiner* — Muhammad Raza

(57) ABSTRACT

A system for managing a network comprising an Operator Domain. The system comprises a hierarchical system of management functions; and a respective service catalogue associated with each management function. The service catalogue storing information of services that can be provided by the management function to at least one higher level management function.

23 Claims, 10 Drawing Sheets

(56) References Cited

U.S. PATENT DOCUMENTS

| | | | |
|---|---|---|---|
| 2017/0303259 A1* | 10/2017 | Lee | H04W 72/048 |
| 2017/0339688 A1* | 11/2017 | Singh | H04W 76/11 |
| 2018/0007009 A1* | 1/2018 | Garcia Azorero | H04L 41/5006 |
| 2018/0310238 A1* | 10/2018 | Opsenica | H04W 12/06 |
| 2019/0104455 A1* | 4/2019 | Park | H04W 36/0022 |
| 2019/0230584 A1 | 7/2019 | Lou et al. | |

OTHER PUBLICATIONS

S5-173149 Huawei,"pCR TR 28 801 Add solution for providing a network slice to a customer",3GPP TSG SA WG5 (Telecom Management) Meeting #113,May 8-12, 2017, West Palm Beach, Florida (US).

S5-171131 Huawei,"Potential solution for automation of customer service provision",3GPP TSG SA WG5 (Telecom Management) Meeting #111,Jan. 16-20, 2017, Porto (Portugal).

NGMN Alliance:"NGMN 5G P1 Requirements and Architecture Work Stream End-to-End Architecture Description of Network Slicing Concept,",Sep. 14, 2016,total 11 pages.

3GPP TSG SA WG5 (Telecom Management) Meeting 112, S5-171759, "pCR TR 28 801 Use case and requirements for NSS capability exposure", Ericsson, Mar. 27-21 Mar. Gulin, China, total 3 pages.

3GPP TSG SA WG5 (Telecom Management) Meeting 113, S5-173148, "pCR TR 28 801 generic customer sevice provision solution", May 8-12, 2017, West Palm Beach, Florida, US, Huawei, total 2 pages.

GPP TR 28.801 V1.1.0:"3rd Generation Partnership Project;Technical Specification Group Services and System Aspects;Telecommunication management;Study on management and orchestration of network slicing fornext generation network(Release 14)",Mar. 2017,total 60 pages.

"3rd Generation Partnership Project; Technical Specification Group Services and System Aspects; Feasibility Study on New Services and Markets Technology Enablers; Stage 1 (Release 14)"; 3GPP TR 22.891 V1.2.0 (Nov. 2015).

"3rd Generation Partnership Project; Technical Specification Group Services and System Aspects; System Architecture for the 5G System; Stage 2 (Release 15)"; 3GPP TS 23.501 V0.3.1 (Mar. 2017).

"5G White Paper Version 1.0"; 5G Initiative Team; Feb. 17, 2015.

"3rd Generation Partnership Project; Technical Specification Group Services and System Aspects; Telecommunication management; Study on management and orchestration of network slicing for next generation network (Release 14)"; 3GPP TR 28.801 V1.1.0 (Mar. 2017).

\* cited by examiner

| SLA Parameter | Example Methods | Requirement |
|---|---|---|
| KPI guarantee for E2E VN service/slice (per geographical bin or/and time or/and user category). e.g.<br>• % users in outage/satisfaction<br>• %area for a given QoE/outage stat<br>• % blocking for pecific demand<br>• % dropping for specific demand | Monitoring of KPI for the service at different geographical bins for time zones, specific user categories, etc. & trigger feedback signals to SOM SOM according o the policy, SOM may take action (police traffic or block further sessions from the same VN (may be based on geography/time and/or a priority criterion), or contact VN customer for instructions ) | • If penalties are specified in SLA to address variability, when close to violations optimization needs to be done to decide what users/slice traffic (may be other services) Monitoring. Policing, blocking, etc. points need to be decided for different measurements, to reflect the geographical areas and different networks/subnetworks. This need to be decided by the SOM during creation.<br>• If multiple services are served by a single slice, service specific data collection, policing and session blocking need to be done by identifying service traffic. |
| End-to-End per UE KPI (e.g. aggregated data rate stats for a UE for time zone, per Gbin, peak rate, latency, mobility dependent KPIs | If per user KPI drops, the SOM get reported, SOM obtains other UE stats in the same area and try to provide priority power over other users if possible (to be fair, policing). It may instruct subnetworks and nodes accordingly | • Per UE traffic need to be identified at selected nodes<br>• Dynamic priority adjustment to address fairness as per SLA (e.g. scheduler) and charging and penalty policies.<br>• The configuration change ability to do above.<br>• VN customer may be allowed to take decision<br>• Extra changes for close-loop QoE management if it is implemented |
| End-to-End per session QoE | Same actions as above is possible (now against other sessions) | • Per session based identifiation<br>• Fairness across sessions to each subnetwork<br>• VN customer may be allowed to take a decision |
| End-to-End per session QoS | Same actions as above is possible (now against other flows, but impact to session, per UE traffic need to be assessed) | • Per flow based identification for a given session<br>• Application/customer may be consulted allowed to control traffic |

FIG. 10

SERVICE PROVISION STEPS USING SLICES AND ASSOCIATED DEFINITIONS

CROSS REFERENCE TO RELATED APPLICATIONS

This application is based on, and claims benefit of, U.S. provisional application No. 62/504,452 filed May 10, 2017, the entire content of which is incorporated herein by reference.

FIELD OF THE INVENTION

The present invention pertains to the field of Communications networks, and in particular to service provision steps using slices and associated definitions.

BACKGROUND

Network function virtualization (NFV) is a network architecture concept that uses the technologies of IT virtualization to create entire classes of virtualized network functions into building blocks that may be connected to each other or to other entities, or may be chained together, to create communication services. NFV relies upon, but differs from, traditional server-virtualization techniques, such as those used in enterprise IT. A virtualized network function (VNF) may consist of one or more virtual machines (VMs) running different software and processes, on top of standard high-volume servers, switches and storage devices, or even cloud computing infrastructure, instead of having custom hardware appliances for each network function. In other embodiments, a VNF may be provided without use of a Virtual Machine through the use of other virtualization techniques including the use of containers. In further embodiments, a customized hardware appliance may be resident within the physical infrastructure used for different virtual networks, and may be presented to each virtual network as a virtual version of itself based on a partitioning of the resources of the appliance between networks. For example, a virtual session border controller could be instantiated upon existing resources to protect a network domain without the typical cost and complexity of obtaining and installing physical network protection units. Other examples of VNFs include virtualized load balancers, firewalls, intrusion detection devices and WAN accelerators.

The NFV framework consists of three main components:
Virtualized network functions (VNFs) are software implementations of network functions that can be deployed on a network functions virtualization infrastructure (NFVI).
Network functions virtualization infrastructure (NFVI) is the totality of all hardware and software components that provide the resources upon which VNFs are deployed. The NFV infrastructure can span several locations. The network providing connectivity between these locations is considered as part of the NFV infrastructure.
Network functions virtualization MANagement and Orchestration (MANO) architectural framework (NFV-MANO Architectural Framework, for example the NFV-MANO defined by the European Telecommunications Standards Institute (ETSI), referred to as ETSI_MANO or ETSI NFV-MANO) is the collection of all functional blocks, data repositories used by these blocks, and reference points and interfaces through which these functional blocks exchange information for the purpose of managing and orchestrating NFVI and VNFs.

The building block for both the NFVI and the NFV-MANO are the resources of an NFV platform. These resources may consist of virtual and physical processing and storage resources, virtualization software and may also include connectivity resources such as communication links between the data centers or nodes providing the physical processing and storage resources. In its NFV-MANO role the NFV platform consists of VNF and NFVI managers and virtualization software operating on a hardware platform. The NFV platform can be used to implement carrier-grade features used to manage and monitor the platform components, recover from failures and provide appropriate security—all required for the public carrier network.

Software-Defined Topology (SDT) is a networking technique that defines a logical network topology in a virtual network. Based on requirements of the service provided on the virtual network, and the underlying resources available, virtual functions and the logical links connecting the functions can be defined by an SDT controller, and this topology can then by instantiated for a given network service instance. For example, for a cloud based database service, an SDT may comprise logical links between a client and one or more instances of a database service. As the name implies, an SDT will typically be generated by an SDT controller which may itself be a virtualized entity in a different network or network slice. Logical topology determination is done by the SDT controller which generates a Network Service Infrastructure (NSI) descriptor (NSLD) as the output. It may use an existing template of an NSI and add parameter values to it to create the NSLD, or it may create a new template and define the composition of the NSI.

Software Defined Protocol (SDP) is a logical End-to End (E2E) technique that may be used within a network service instance. SDP allows for the generation of a customized protocol stack (which may be created using a set of available functional building blocks) that can be provided to different nodes or functions within the network, or network slice. The definition of a slice specific protocol may result in different nodes or functions within a network slice having defined procedures to carry out upon receipt of a type of packet. As the name implies, an SDP will typically be generated by one or more SDP controllers which may be virtualized functions instantiated upon a server.

Software-Defined Resource Allocation (SDRA) refers to the process of allocation of network resources for logical connections in the logical topology associated with a given service instance or network slice. In an environment in which the physical resources of a network are used to support a plurality of network slices, an SDRA controller will allocate the processing, storage and connectivity resources of the network to the different network slices to best accommodate the agreed upon service requirements for each of the network slices. This may result in a fixed allocation of resources, or it may result in an allocation that is dynamically changed to accommodate the different temporal distribution of traffic and processing requirements. As the name implies, an SDRA Controller will typically determine an allocation of resources, and may be implemented as a function that is instantiated upon a server.

Service Oriented Network Auto Creation (SONAC) is a technology that makes use of software-defined topology (SDT), software defined protocol (SDP), and software-defined resource allocation (SDRA) techniques to create a network or virtual network for a given network service instance. By coordinating the SDT, SDP, SDRA and in some embodiments Software Defined Network (SDN) control, optimization and further efficiencies can be obtained. In some cases, a SONAC controller may be used to create a network slice within which a 3rd Generation Partnership Project (3GPP) compliant network can be created using a virtualized infra-structure (e.g. VNFs and logical links) to provide a Virtual Network (VN) service. Those skilled in the art will appreciate that the resources allocated to the different VNFs and logical links may be controlled by the SDRA-type functionality of a SONAC controller, while the manner in which the VNFs are connected can be determined by the SDT-type functionality of the SONAC controller. The manner in which the VNFs process data packets may be defined by the SDP-type functionality of the SONAC controller. A SONAC controller may be used to optimize the Network Management, and so may also be considered to be a Network Management (NM) optimizer.

Network slicing refers to a technique for creating virtual networks which separate different types of network traffic, and which can be used in reconfigurable network architectures such as networks employing network function virtualization (NFV). A network slice (as defined in 3GPP TR 22.891 entitled "Study on New Services and Markets Technology Enablers," Release 14, Version 1.2.0, Jan. 20, 2016, is composed of a collection of logical network functions that supports communication service requirements of particular use cases. More broadly, a network slice may be defined as a collection of one or more core bearers (or PDU sessions) which are grouped together for some arbitrary purpose. This collection may be based on any suitable criteria such as, for example, business aspects (e.g. customers of a specific Mobile Virtual Network Operator (MVNO)), Quality of Service (QoS) requirements (e.g. latency, minimum data rate, prioritization etc.); traffic parameters (e.g. Mobile Broadband (MBB), Machine Type Communication (MTC) etc.), or use case (e.g. machine-to-machine communication; Internet of Things (IoT), etc.).

In order to provide network slicing services, various interactions and network management functions are involved. Different service types of network slicing may request different management functions. As the implementation details and standards of NFV evolve, architectural options for providing network slicing services in a consistent and reliable manner are highly desirable.

Within this disclosure, references to "traditional" or conventional networks, and to traditional or conventional network management, should be understood to refer to networks and network management techniques that do not support slicing.

Within this disclosure, abbreviations that are not specifically defined herein should be interpreted in accordance with the NGNM Alliance papers such as "5G White Paper" Version 1.0, NGMN Alliance, February 2015, and the 3rd Generation Partnership Project (3GPP) Technical Standards, such as, for example, Technical Standard TS 23.501 V0.3.1 (March 2017).

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods for providing network slicing services to a customer.

Accordingly, an aspect of the present invention provides a system for managing a network comprising an Operator Domain. The system comprises a hierarchical system of management functions; and a respective service catalogue associated with each management function. The service catalogue storing information of services that can be provided by the management function to at least one higher level management function.

BRIEF DESCRIPTION OF THE FIGURES

Further features and advantages of the present invention will become apparent from the following detailed description, taken in combination with the appended drawings, in which:

FIG. 10 is a table describing Generic QoS/QoE management methods monitoring and accounting.

It will be noted that throughout the appended drawings, like features are identified by like reference numerals.

DETAILED DESCRIPTION

Figure 1:
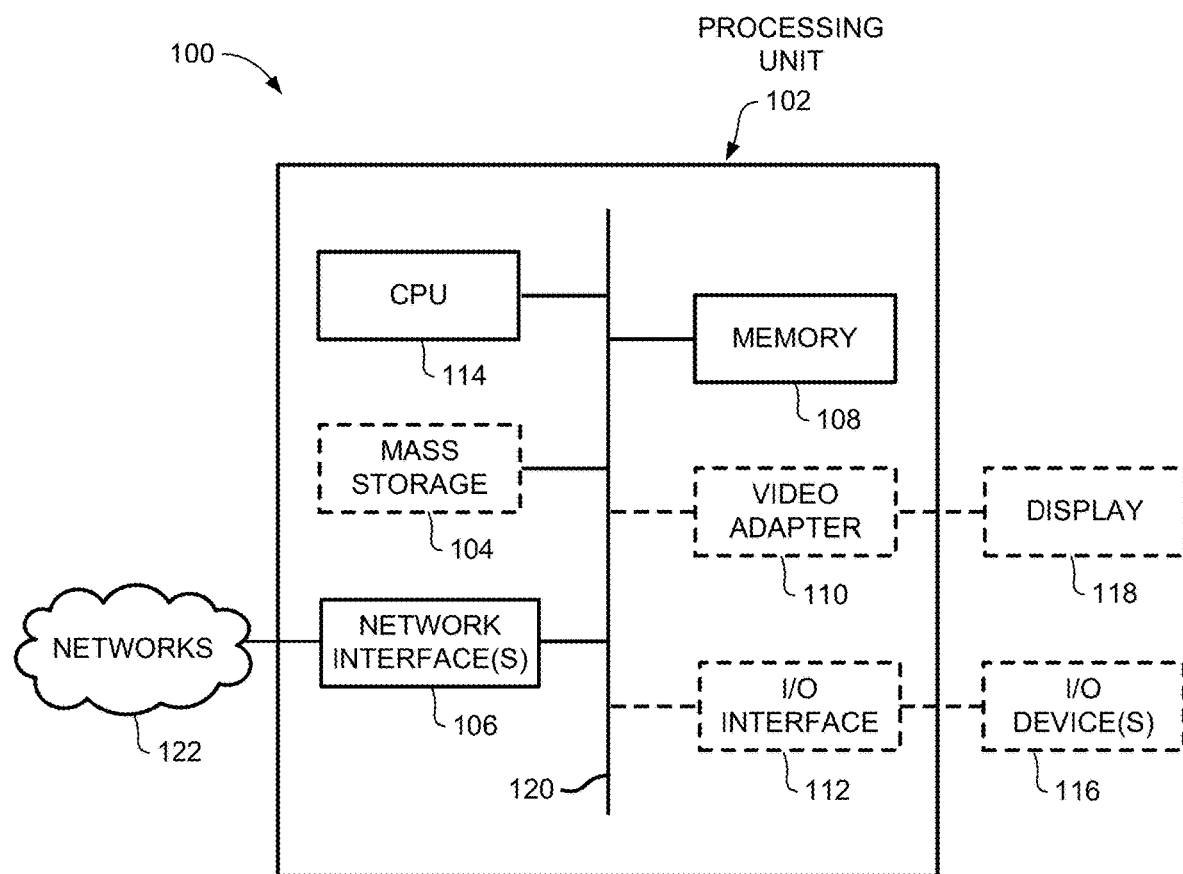
FIG. 1 is a block diagram of a computing system 100 that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 typically includes a central processing unit (CPU) 114, a bus 120 and a memory 108, and may optionally also include a mass storage device 104, a video adapter 110, and an I/O interface 112 (shown in dashed lines).

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
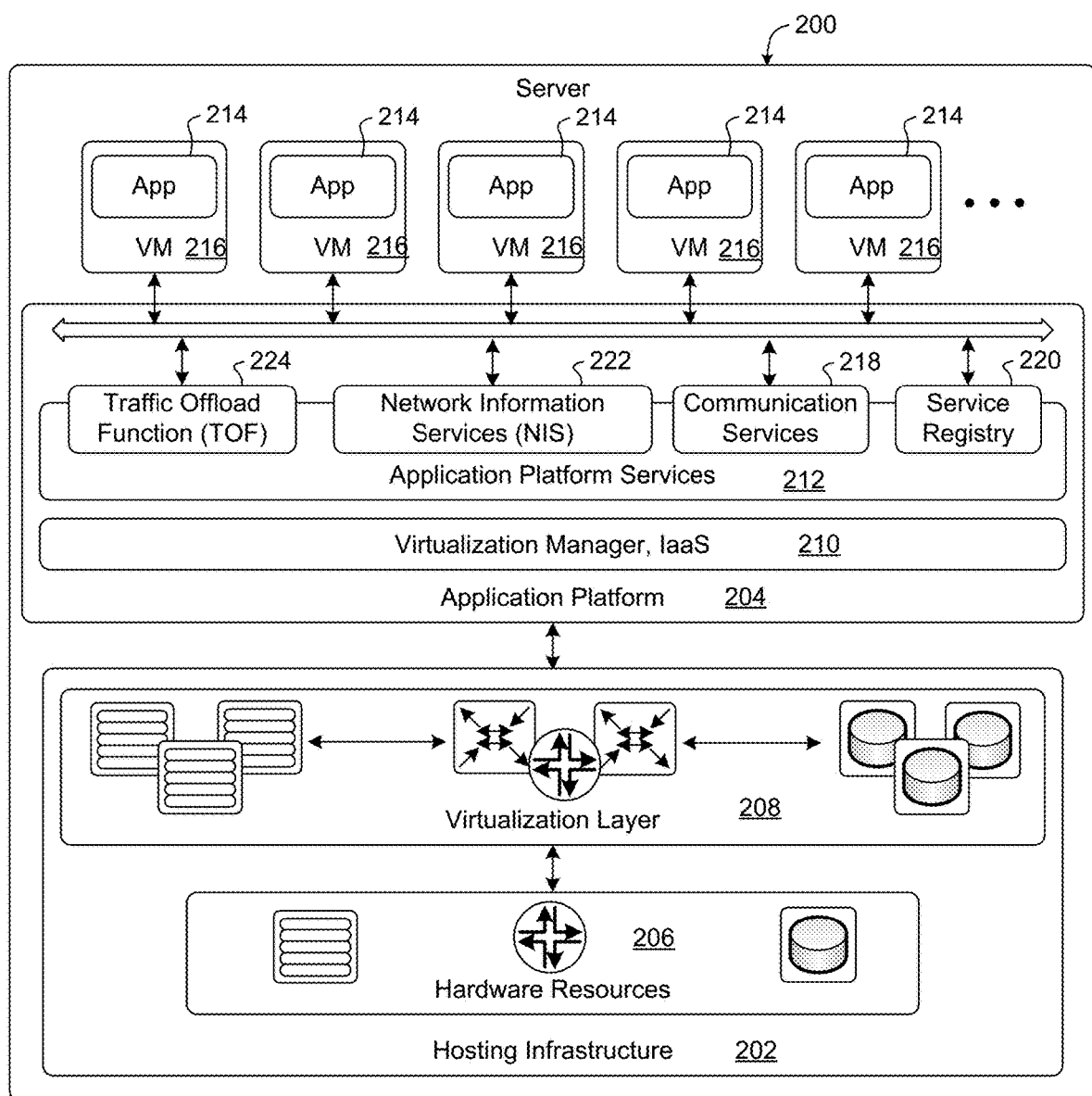
FIG. 2 is a block diagram schematically illustrating an architecture of a representative server usable in embodiments of the present invention.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software.

As maybe seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216, or as a virtualized container, that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANO and SONAC (and its various functions such as SDT, SDP, and SDRA) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A Service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (uplink and/or downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
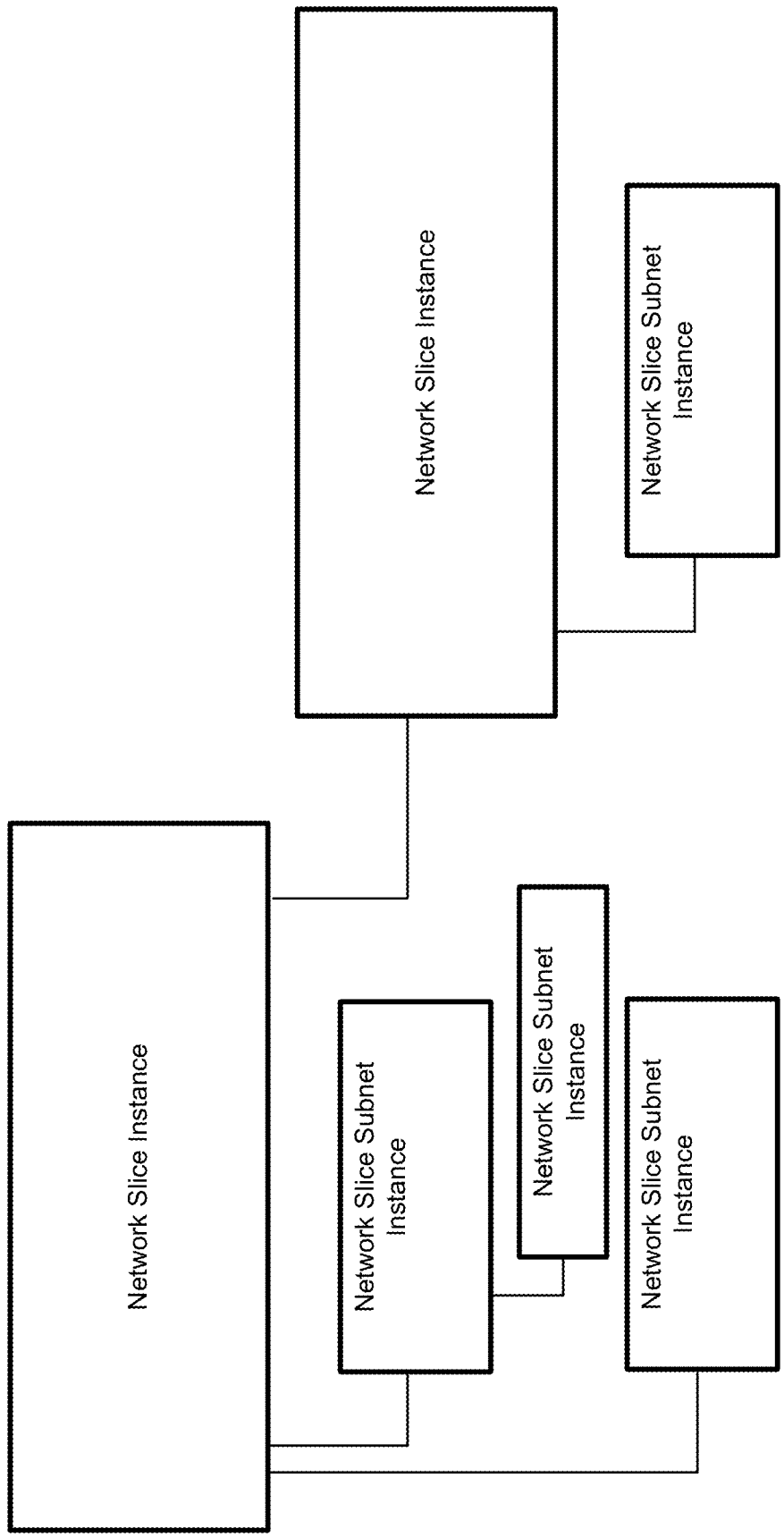
FIG. 3 is a block diagram illustrating an example of E2E communication services provided by a sliced network.

FIG. 3 illustrates a model for the management of resources. A 3GPP compliant Network Slice Instance (NSI)

is considered to have associated resources, and may incorporate a Network Slice Subnet Instance (NSSI) with it. An NSSI may be a core network slice, or it may be a RAN slice. Through aggregating the resources of the various NSSIs within an NSI, it is possible to create an end-to-end network. Services requested from sub-domains may be provided as an NSSI.

By extending the 3GPP compliant model, an NSI can incorporate another NSI (which may be composed of at least one NSI). This may result in redundant resources, for example more than one core network slice. This can be accommodated using, for example, a geographic or device type profile. This would allow a first core network slice having associated RAN slices to serve a first geographic area, for example, while a second core network slice having a different set of RAN slices may serve a second geographic area.

In embodiments where RANs are shared between different core network slices, the selection of a core network slice may be a function of the service to which an electronic device such as a UE is subscribed, or it may be a function of the type of UE connecting (e.g. machine type communication devices may be assigned to the second core slice).

To provide network slicing services, a variety of interactions and network management functions are involved. Different service types of network slicing may request different management functions. Thus, it is necessary to define interfaces, relationships, involved management functions, and different options. In this disclosure, to realize the interaction between the customer and the operator in different service types, several frameworks are described to define the interaction between the customer and network management functions in the operator domain.

Customer Service Categories that may be supported by a 5G network include:

Type (A): Virtual Network with E2E service requirements for a VN customer with its own user/device population;
Type (B): Virtual Network with a Specific Topology. This Category may include:
Network topology with instantiated network functions
Network topology with network function chains
Network topology with pre-configured routing
With or without control to 3rd parties
Type (C): Asset Provider, as described, for example, in "5G White Paper" Version 1.0, NGMN Alliance, February 2015;
Type (D): On-demand connectivity for a single session (direct end user request from MNO). This may include multiple devices, No SLA directly to end users (e.g., video conference for one time, on-demand charging, reverse charging/free basic services, emergency services, pay as go, etc).

This categorization is useful for automated service provision, service negotiation with customers and MNO-MNO negotiations. Included service categorization as a solution and A, B, and C as first level of categorization. See, for example TR28.801

The following paragraphs discuss various management functions (CSMF, NSMF, NSSMF) involvement in different types of Persona (business entities) providing different types of services (e.g. service instance, NSI as a service, NSSI as a service). The following subsections explains these classifications in detail.

Management Functions for E2E Communication Services Provided by a Sliced Network When a customer requires an End-to-End (E2E) communication services, the network provider has to use an E2E network slice and ensure the E2E performance. In this case the network provider takes the role of a Customer Slice Provider (CSP). The Communications Service Management Function (CSMF) will provide the NSMF with network slice requirements that corresponds to the service requirements. The service instance is the internal 3GPP representation of the service provided using the NSI. There can be multiple service instances served using the same NSI. It may be noted that sharable Ne Functions (NFs) are identified by NSMF and NSSMF.

Figure 4:
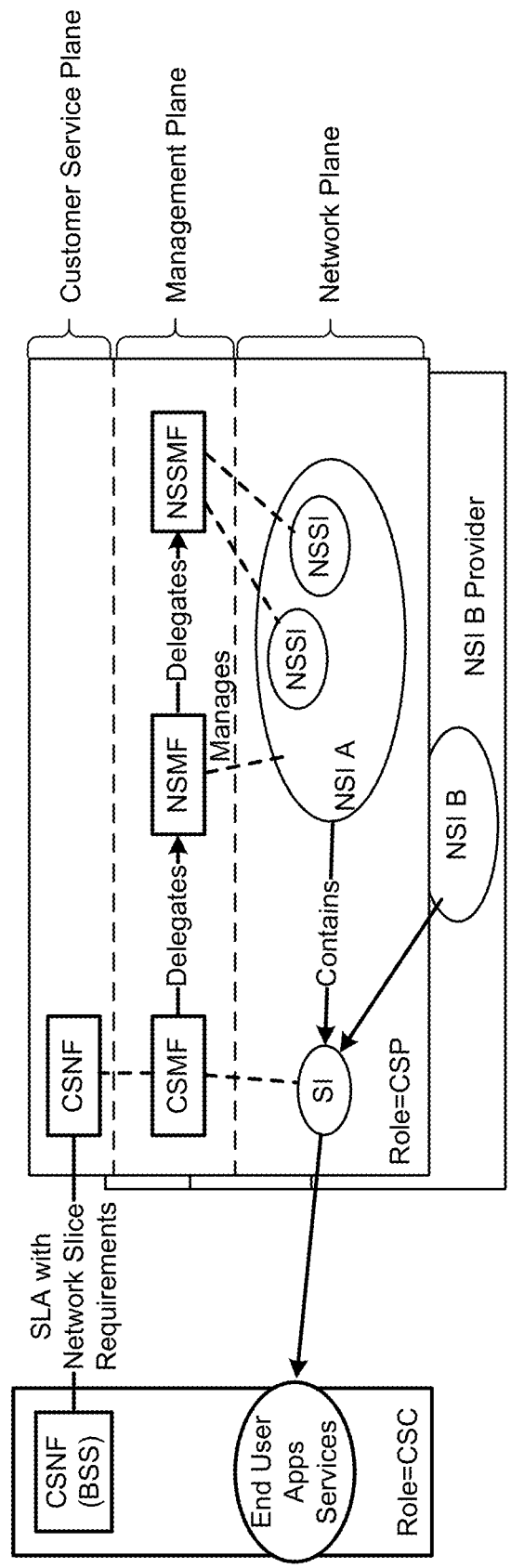
FIG. 4 is a block diagram schematically illustrating an example of NSI as a service.

FIG. 4 shows an example of E2E communication services provided by a sliced network. In this case, the network slice management is fully hidden to customers (E2E customer) by CSP in an E2E slicing service. Service request and related service negotiations and service related information including feedback and service request modification happens between the customer and the CSMF. For example, a network slice service may be provided to meet customer's communication service requirements with certain service data exposure without any exposure of internal NSI structures and management functions.

Management Functions Involved in Providing NSI as a Service

Figure 5:
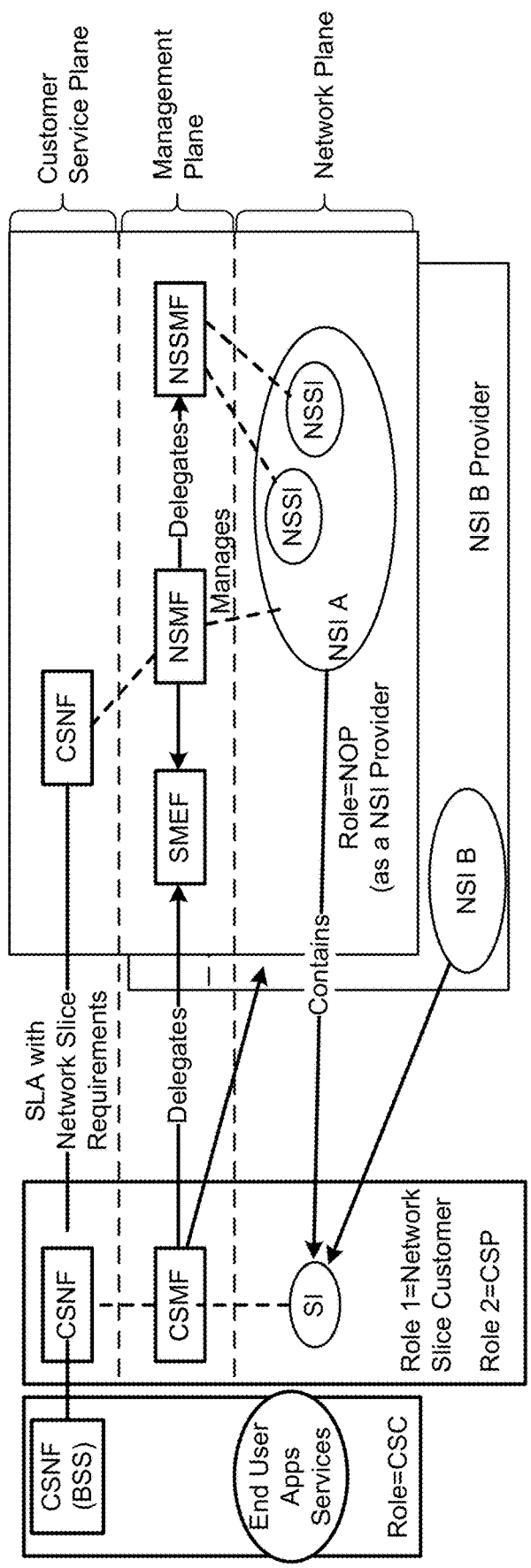
FIG. 5 is a block diagram schematically illustrating an example of NSSI as a service.

FIG. 5 shows the involvement of the management functions in providing an NSI as a service. The customer can be provided with limited network management capabilities by exposing certain management functions of the NSMF as through a Slice Management Exposure Function (SMEF). For example, a network slice service may be provided to meet certain network slice requirements (e.g. NFs, topology, etc) with certain network management capability (e.g., network monitoring capability).

The service request and related service negotiation happens initially between the customer and the CSMF which is indicated by the green line. However, after the Service Level Agreement (SLA) is established, the network provider may provide authorized access to certain NSMF functions so that the customer can use the NSI for its communication services.

NOTE: How much is exposed is determined by the operator and captured in the SLA since some of the management functionality may be handled by the Network Operator (NOP), for example CM and FM may be done by NOP and PM may be done by the customer.

Management Functions Involved in Providing NSSI as a Service

Figure 6:
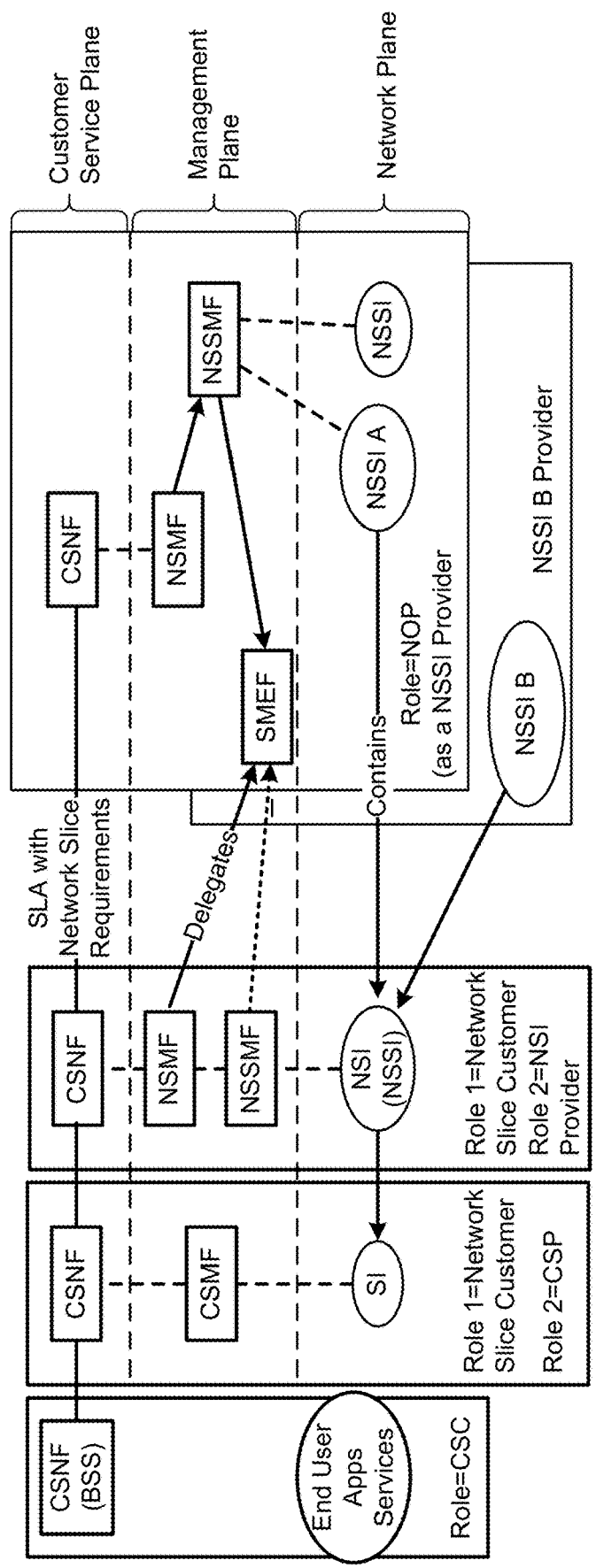
FIG. 6 is a block diagram schematically illustrating an example framework for interactions between the customer and network management functions in the operator domain.

FIG. 6 shows the involvement of the management functions in providing an NSSI as a service. As in the example of FIG. 5, the customer can be provided with limited network management capabilities by exposing certain management functions of the NSMF and NSSMF through a Slice Management Exposure Function (SMEF). For example, a network slice service may be provided to meet certain network slice requirements (e.g. NFs, topology, etc) with certain network management capability (e.g., network monitoring capability) and internal NSI structures (e.g., NSSI)

The service request and related service negotiation may happen initially between the customer and the CSMF. However, after the SLA is established, the network provider may provide authorized access to certain NSSMF functions so that the customer can use the NSSI for its communication purposes. It may be appreciated that if this NSSI is requested by another NSSMF, the NSSMF needs to be involved. This is described in further detail below.

Figure 7:
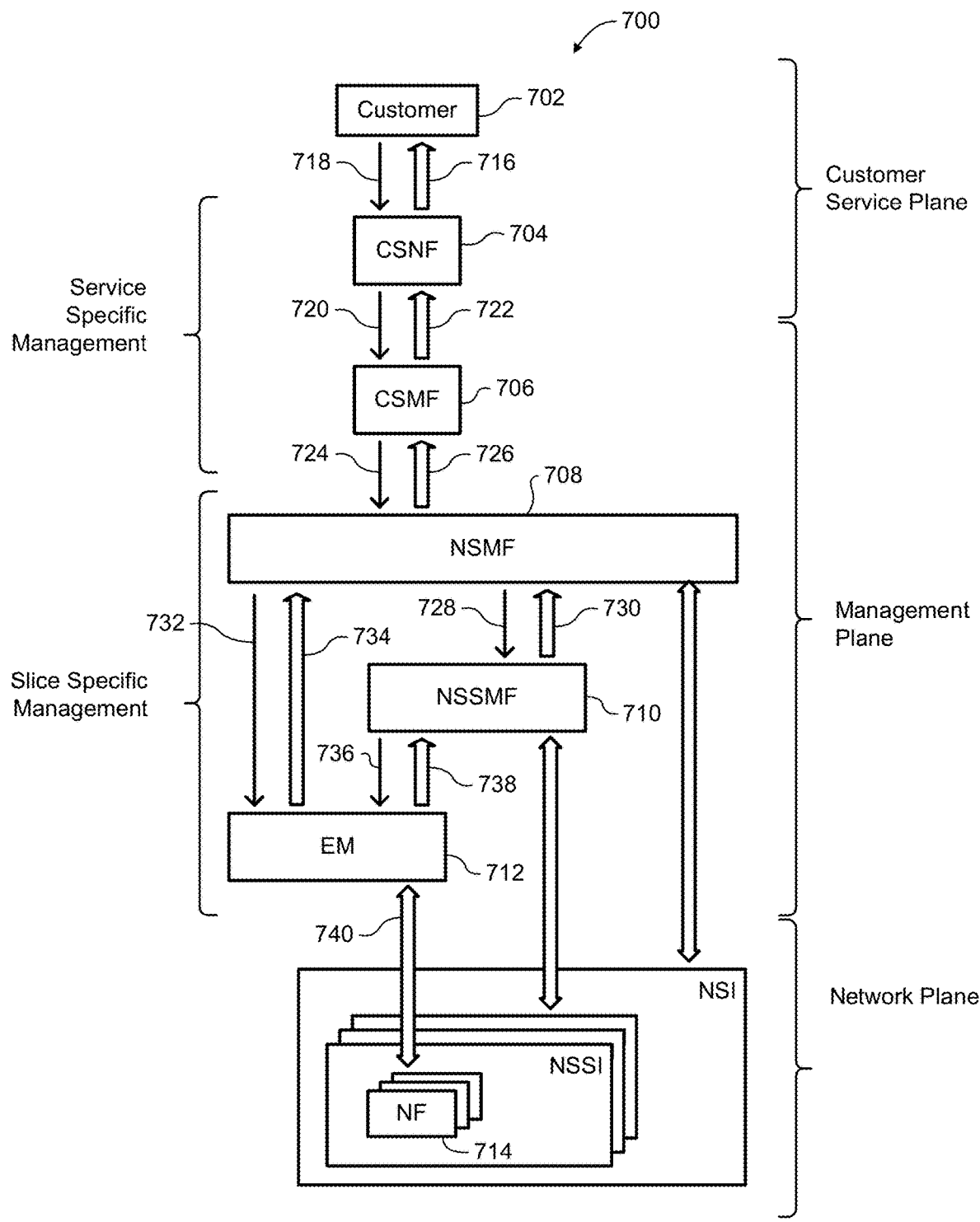
FIG. 7 is a block diagram schematically illustrating an example hierarchy of management functions in accordance with embodiments of the present invention.

FIG. 7 is a block diagram schematically illustrating an example hierarchy 700 of management functions in accordance with embodiments of the present invention.

As may be seen in FIG. 7, the example hierarchy of management functions comprises the CSNF 704, CSMF 706, NSMF 708, NSSMF 710 and EM 712 functions arranged in a series of layers extending between the customer 702 and Network Functions 714 in the Network Plane. For the purposes of this example, the customer 702 is assumed to be an entity that provides networking services to a plurality of end users within a virtual network. The CSNF 704, CSMF 706, NSMF 708, NSSMF 710 and EM 712 functions are configured to provide virtual network services to the customer 702 in accordance with a negotiated Service Level Agreement (SLA).

In the example hierarchy of FIG. 7, each layer provides services to the layer above it, and sends service requests and/or service requirements to the layer below it.

The Customer Service Negotiation Function (CSNF) 704 provides admission control, SLA attribute negotiation and virtual network services (at 716) to the Customer 702, based on service requirements received (at 718) from the customer 702. The CSNF 704 also sends negotiated SLA parameters to the CSMF 706 (at 720), and receives Service Instance definition services from the CSMF 706 (at 722). The SLA parameters may include:
Network Key Performance Indicators (KPI) for the Customer's network.
Application requirements including service graphs
Penalties.
User/Traffic demand distribution (time/geographical)
Charging methods The Customer Service Management Function (CSMF) 706 provides Service Instance (SI) definition services to the CSNF 704 (at 722), based on the SLA parameters received from the CSNF 704 (at 720). The CSMF 706 also sends SI specification parameters to the NSMF 708 (at 724), and receives Network Slice Instance (NSI) services from the NSMF 708 (at 726). The Customer Service Instance parameters define the network requirements to meet the SLA, and may include:
NF graphs for different service flows
Maximum resource requirements for different time periods
Accounting requirements
Exposure levels, etc.

In some embodiments, the CSMF may incorporate the CSNF functionality. In such cases, interfaces between the CSNF and other entities shown in the appended figures will be replaced by equivalent interfaces between the CSMF and those other entities.

The Network Slice Management Function (NSMF) 708 provides Network Slice instantiation and management services (at 726) to the CSMF 706, based on SI specification parameters received (at 724) from the CSMF 706. The NSMF 708 may interact with one or more Network Slice Subnet Management Functions (NSSMFs) 710 and/or one or more Element Managers (EMs) 712 to perform its functions. For example, the NSMF 708 may send NSSI specification parameters to an NSSMF 710 (at 728), and receive corresponding NSSI services from the NSSMF 710 (at 730). Similarly, the NSMF 708 may send Virtual Network Function (VNF) and Physical Network Function (PNF) specification parameters to an EM 712 (at 732), and receive corresponding virtual and physical network functions from the EM 712 (at 734). Network Slice Instance (NSI) and Network Slice Subnet Instance (NSSI) specification parameters define the network requirements to for each Slice/Slice Subnet, and may include:
NF graphs for different service flows
QoS/QoE requirements
Maximum resource requirements for different time periods
Accounting requirements, etc.

The Network Slice Subnet Management Functions (NSSMFs) 710 provides Network Slice Subnet instantiation and management services (at 730) to the NSMF 708, based on NSSI specification parameters received from the NSMF 708 (at 728). The NSSMF 708 may interact with one or more other Network Slice Subnet Management Functions (NSSMFs) 710 and/or one or more Element Managers (EMs) 712 to perform its functions. For example, the NSSMF 710 may send NSSI specification parameters to another NSSMF (not shown), and receive corresponding NSSI services from that NSSMF. Similarly, the NSSMF 710 may send Virtual Network Function (VNF) and Physical Network Function (PNF) specification parameters to an EM 712 (at 736), and receive corresponding virtual and physical network functions from the EM 712 (at 738).

The Element Manager 712 provides virtual and physical network functions (at 734 and 738) to the NSMF 708 and/or an NSSMF 710, based on VNF and PNF specification parameters received from the NSMF 708 (at 732) and an NSSMF 710 (at 736). The EM 712 operates (at 740) to instantiate, provision, and manage virtual and physical network functions 714 of the network plane in accordance with the received VNF and PNF specification parameters.

Figure 8:
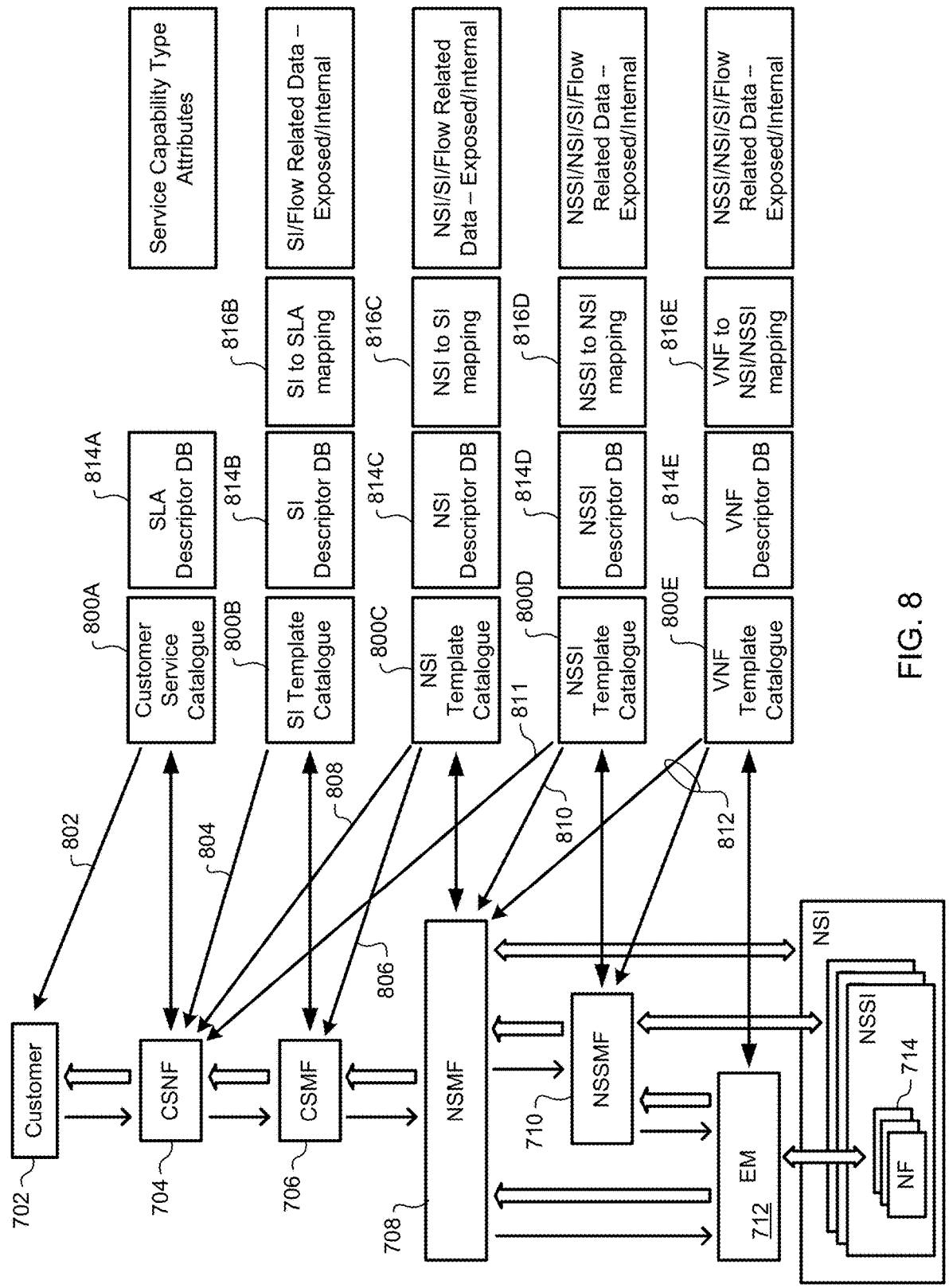
FIG. 8 is a block diagram schematically illustrating example interactions between management functions in the hierarchy of FIG. 7.

FIG. 8 is a block diagram schematically illustrating example interactions between management functions in the hierarchy of FIG. 7. As may be seen in FIG. 8, each of the CSNF 704, CSMF 706, NSMF 708, NSSMF 710 and EM 712 functions maintains a catalogue 800 of services that can be offered to an upper layer of the hierarchy. This catalogue may be a detailed description for the type of services or a high level view of the services it can provide.

For example, if a particular area is covered by a RAN that can support 50-400 users with different types of video (HD-4k) sessions, 500 with high grade voice services, 1000 with standard voice services, the RAN may provide a service catalogue in following ways:
RAN can support video and voice services;
RAN can support HD and 4K video and high quality and low quality voice services;
Provide a list of codecs that is associated with the above services and coverage area limitations.

In the first of the above options the higher layer function (e.g. an NSMF which is a client/customer of the RAN) cannot prepare its Catalogue to the CSMF with details.

To provide services to high level management functions, the service management function entity should provide a catalogue of the sliced services it can support (deliver). As shown, in FIG. 8, CSNF, CSMF, NSMF, NSSMF, and EM have different catalogues exposed to high level management functions, as will be described in greater detail below.

Catalogues in each management entity may be generated and maintained by requesting and coordinating lower level services and current serving services. It should be noted that the maintenance of each catalogue is dynamic, which means it will be updated by the corresponding entity according to current services and lower level services.

Preferably, the catalogue 800 of services maintained at a given layer, is exposed to at least one upper (or client) layer, so as to facilitate selection of services by the client layer.

For example, the CSNF 704 maintains a Customer Service Catalogue 800A defining network services that may be offered to the client 702. In some embodiments, the Customer Service Catalogue 800A may include a set of templates that can be used to negotiate an SLA with the customer, and which also contains the parameters needed by the CSMF to define an appropriate Service Instance for the negotiated SLA. Preferably, the Customer Service Catalogue 800A is exposed to the Customer (as shown at 802). This enables the customer to access the Customer Service Catalogue 800A and select a network service or template that best suits its needs.

The Customer Service Catalogue 800A may be generated and managed by the CSNF to expose information on available services to customers. This information might include SLA attributes such as:
Service type
Network KPI for its network.
Application requirements including service graphs
Penalties.
User/Traffic demand distribution (time/geographical)
Charging methods It should be noted that, as the CSNF is the entity facing the customer, all types of services should be provided by this Customer Service Type Catalogue. Therefore, all four lower catalogues may be able to expose data to the CSNF.

The CSMF 706 maintains a Service Instance Template Catalogue 800B which includes a set of templates that can be used to define a Service Instance to meet a negotiated SLA, and which also contains the SI specification parameters needed by the NSMF to define an appropriate Network Slice Instance for a given Service Instance. Preferably, the Service Instance Template Catalogue 800B is exposed to the CSNF 704 (as shown at 804). This enables the CSNF 704 to access the Service Instance Template Catalogue 800B to obtain SI specification parameters that may be used to construct Customer Service Templates and to associate those templates with the Service Instance Templates saved in the Service Instance Template Catalogue 800B.

The Service Instance Template Catalogue 800B may be generated and managed by the CSMF to expose information on E2E services to the CSNF. This information might include Customer Service Instance attributes, which also can be Network Requirements for SLA, such as:
NF graphs for different service flows
Maximum resource requirements for different time periods
Accounting requirements
Exposure levels, etc.

The NSMF 708 maintains a Network Slice Instance Template Catalogue 800C which includes a set of templates that can be used to define a Network Slice Instance to satisfy a given Service Instance, and which also contains the NSI, NSSI, VNF and PNF specification parameters needed by the NSSMF and/or EM to define an appropriate Network Slice Subnet Instance and/or Network Functions for a given Network Slice Instance. Preferably, the Network Slice Instance Template Catalogue 800C is exposed to the CSMF 706 (as shown at 806). This enables the CSMF 706 to access the Network Slice Instance Template Catalogue 800C to obtain NSI specification parameters that may be used to construct Service Instance Templates and to associate those templates with the Network Slice Instance Templates saved in the Network Slice Instance Template Catalogue 800C. In addition, the Network Slice Instance Template Catalogue 800C may also be exposed to the CSNF 704 (as shown at 808). This enables the CSNF 704 to access the Network Slice Instance Template Catalogue 800C to obtain NSI specification parameters that may be used to construct Customer Service Templates and to associate those templates with the Network Slice Instance Templates saved in the Network Slice Instance Template Catalogue 800C.

The Network Slice Instance Template Catalogue 800C may be generated and managed by the NSMF to expose information on NSI services to the CSMF and the CSNF. This information might include Network Slice Instance attributes (internal), which also can be Network Requirements for a slice, such as:
NF graphs for different service flows
QoS/QoE requirements
Maximum resource requirements for different time periods
Accounting requirements, etc.

The NSSMF 710 maintains a Network Slice Subnet Instance Template Catalogue 800D which includes a set of templates that can be used to define a Network Slice Subnet Instance to satisfy a given Network Slice Instance, and which also contains the NSSI, VNF and PNF specification parameters needed by another NSSMF and/or an EM to define an appropriate Network Slice Subnet Instance and/or Network Functions for a given Network Slice Subnet Instance. Preferably, the Network Slice Subnet Instance Template Catalogue 800D is exposed to the NSMF 708 (as shown at 810). This enables the NSMF 708 to access the Network Slice Subnet Instance Template Catalogue 800D to obtain NSSI specification parameters that may be used to construct Network Slice Instance Templates and to associate those templates with the Network Slice Subnet Instance Templates saved in the Network Slice Subnet Instance Template Catalogue 800D. In addition, the Network Slice Subnet Instance Template Catalogue 800D may also be exposed to the CSNF 704 (as shown at 811). This enables the CSNF 704 to access the Network Slice Subnet Instance Template Catalogue 800D to obtain NSSI specification parameters that may be used to construct Customer Service Templates and to associate those templates with the Network Slice Instance Templates saved in the Network Slice Subnet Instance Template Catalogue 800D.

Network Slice Subnet Instance Template Catalogue 800D may be generated and managed by NSSMF to expose information on NSSI service to the NSMF. This information might include Network Slice Subnet Instance attributes, which also can be Network Requirements for a slice and the same as NSI attributes.

The EM 712 maintains a Virtual Network Function Template Catalogue 800E which includes a set of templates that can be used to define Virtual Network Functions to satisfy a given Network Slice/Slice Subnet Instance. Preferably, the Virtual Network Function Template Catalogue 800E is exposed to the NSMF 708 and the NSSMF 710 (as shown at 812). This enables the NSMF 708 and the NSSMF 710 to access the Virtual Network Function Template Catalogue 800E to obtain VNF specification parameters that may be used to construct Network Slice/Slice Subnet Instance Templates and to associate those templates with the VNF Templates saved in the Virtual Network Function Template Catalogue 800E.

The Virtual Network Function Template Catalogue 800E may be generated and managed by EM to expose information on VNF services to the NSMF/NSSMF. This information might include VNF attributes, which also can be Network Requirements for a slice and the same as NSI attributes.

In addition to the template catalogues 800, each of the CSMF 706, NSMF 708, NSSMF 710 and EM 712 functions maintains a service instance database 814 storing information identifying each service instance that has been created (at that layer), as well as a service mapping database 816 that stores information identifying the relationship between each created service and upper layer services that have been allocated (or that use) that service.

For example, the CSNF 706 maintains an SLA Database 814A containing information of SLAs of current and past services. When a service request is admitted, its SLA will be stored in the SLA DB 814A to be guaranteed by managed and monitored.

The CSMF 706 maintains an SI descriptor Database 814B containing information defining each network Service Instance (SI) using SI descriptors provided by the CSNF, and an SI to SLA mapping database 816B that identifies each SLA that has been allocated to a given SI. For example, the CSMF may determine that multiple SLAs (negotiated by the CSNF) can share a single network Service Instance (SI). In that case, the CSMF may allocate each of those SLAs to the network Service Instance (SI), and this allocation may be recorded in the SI to SLA mapping database 816A. to store current SI by. The SI descriptor Database 814B may be used to manage created SIs that can be active or not. In addition, it can be used for monitoring and data analytics, if desired.

The NSMF 708 maintains an NSI descriptor Database 814C containing information defining each Network Slice Instance (NSI) using NSI descriptors provided by the CSMF, and an NSI to SI mapping database 816C that identifies each SI that has been allocated to a given NSI. For example, the NSMF may determine that multiple SIs (instantiated by the CSMF) can share a single Network Slice Instance (NSI). In that case, the NSMF may allocate each of those SIs to the NSI, and this allocation may be recorded in the NSI to SI mapping database 816C. The NSI descriptor Database 814C may be used to manage created NSIs that can be active or not. In addition, it can be used for monitoring and data analytics, if desired.

The NSSMF 710 maintains an NSSI descriptor Database 814D containing information defining each Network Slice Subnet Instance (NSSI) using NSSI descriptors provided by the NSMF, and an NSSI to NSI mapping database 816D that identifies each NSI that has been allocated to a given NSSI. For example, the NSSMF may determine that multiple NSIs (instantiated by the NSMF) can share a single Network Slice Subnet Instance (NSSI). In that case, the NSSMF may allocate each of those NSIs to the NSSI, and this allocation may be recorded in the NSSI to NSI mapping database 816D. The NSSI descriptor Database 814D may be used to manage created NSSIs that can be active or not. In addition, it can be used for monitoring and data analytics, if desired.

The EM 712 maintains a VNF descriptor Database 814E containing information defining each Virtual Network Function (VNF) using VNF descriptors provided by the NSMF/NSSMF, and a VNF to NSI/NSSI mapping database 816E that identifies each NSI/NSSI that has been allocated to a given VNF. For example, the EM may determine that multiple NSIs (instantiated by the NSMF) or NSSIs (instantiated by the NSSMF) can share a single Network Slice Subnet Instance (VNF). In that case, the EM may allocate each of those NSIs/NSSIs to the VNF, and this allocation may be recorded in the VNF to NSI/NSSI mapping database 816E. The VNF descriptor Database 814E may be used to manage created VNFs that can be active or not. In addition, it can be used for monitoring and data analytics, if desired.

Data Storage and Exposure

As shown in FIG. 8 CSMF, NSMF, NSSMF, and EM have their own data management entities, which are used to store, analyse, and expose data from VNFs, NSSIs, NSIs, SIs and flows. Those data can be used internally or be exposed to higher level entities or the customer.

For NSMF, NSI/SI/Flow-related data will be stored in the entity. According to requirements, NSMF can expose requested data to the customer. Alternatively, NSMF can set accessibly for the customer to access certain data.

Those functions are all applied to NSSMF and EM. They have lower level data such as NSSI-related and VNF-related data.

Admission Control

As shown in FIG. 1, a whole procedure may include the following steps:

Step (1): Each entity maintains its corresponding service type catalogue. NOTE: This step will be executed periodically according to the changes of current services and lower level services.

Step (2): According to the Customer Service Type Catalogue that can be a Customer Service Type Template including types, attributes and capability of available service, the Customer will send a service request to CSNF by using a descriptor.

Step (3): When a service request received, the CSNF checks the feasibility (admission control) of the service by considering exposed lower level service type catalogues and the exposed level of the current loading. Several ways to do that based on this loading exposure level of lower layer (Provider) to the upper layer (customer). Depending on the type of the business role, the customer provider relationship/interface can be one of the following (CSNF/CSMF, CSMF/NSMF, NSMF/NSSMF, CSNF/NSMF, CSNF/NSSMF, etc.) This may be done by each layer exposing its current loading
    levels to the upper layer and upper layer (e.g. CSNF) taking the admission decision with some co-ordination with the lower layer (e.g. CSMF).

Lower layer (provider, e.g. NSMF) indicating to the upper layer/customer (CSNF) capacity (maximum capability) levels that can be supported (may be per each service type) at a given time. This way, the upper layer can take a decision on admission automatically without asking the lower layer (but request the lower layer to reserve resources until the admission is confirmed). Lower layer (Provider) does its capability evaluation based on the provider (e.g. NSMF) loading levels and loading levels of the other child management systems the provider manages (e.g. NSSMF). So NSSMF provides current maximum capability to NSMF, NSMF provides its capability to CSNF taking into account the NSSMF capabilities, and CSNF taking a decision. If a NSSMF uses its resources for a different NSMF, then NSSMF should provide numbers to both NSMFs using some sharing strategy.

Lower layer does not expose current loading levels or capacity levels. So the upper layer has to ask the lower layer entities whether it can support certain capabilities and if so does the admission.

Step (4): CSNF sends service requests and SLA attributes to CSMF and store those SLA in SLA DB for further maintenance.

Step (4): When SLA is received by CSMF,
if it is not an E2E service, it passes to NSMF or
it maps SLA to network requirements and passes to NSMF
If it is an E2E service, it checks NSI type of Catalogue. If services are available, CSMF maps SLA to service requests and network requirements and passes to NSMF.

Step (6): When network requirements are received by the NSMF or the NSSMF, it checks lower level service type of catalogue. If services are available, NSMF or NSSMF passes service requests and network requirements NSSMF or EM.

Step (7): If each service is admitted, they can send an ACK to high level entities and adjust the new capacity levels to the higher layers (if they are exposed).

Creation

When a new service is admitted, the CSNF may send creation requests to related entities. Once creation requested by managed function entities, they create service instances (SI, NSI, NSSI, VNF) and associate them to high level services. Meanwhile, the descriptor(s) used to generate the service may be stored in corresponding DB 814. The loading/capacity exposure parameters may be changed according to the newly admitted service.

Data Exposure

Once a service is admitted, each lower layer may expose the management of other data related to the service is exposed to the higher layer according to the agreement (SLA). Data may be categorized as needed. This data may be used by each management entity for itself and in turn exposed to next higher layer as required.

Figure 9:
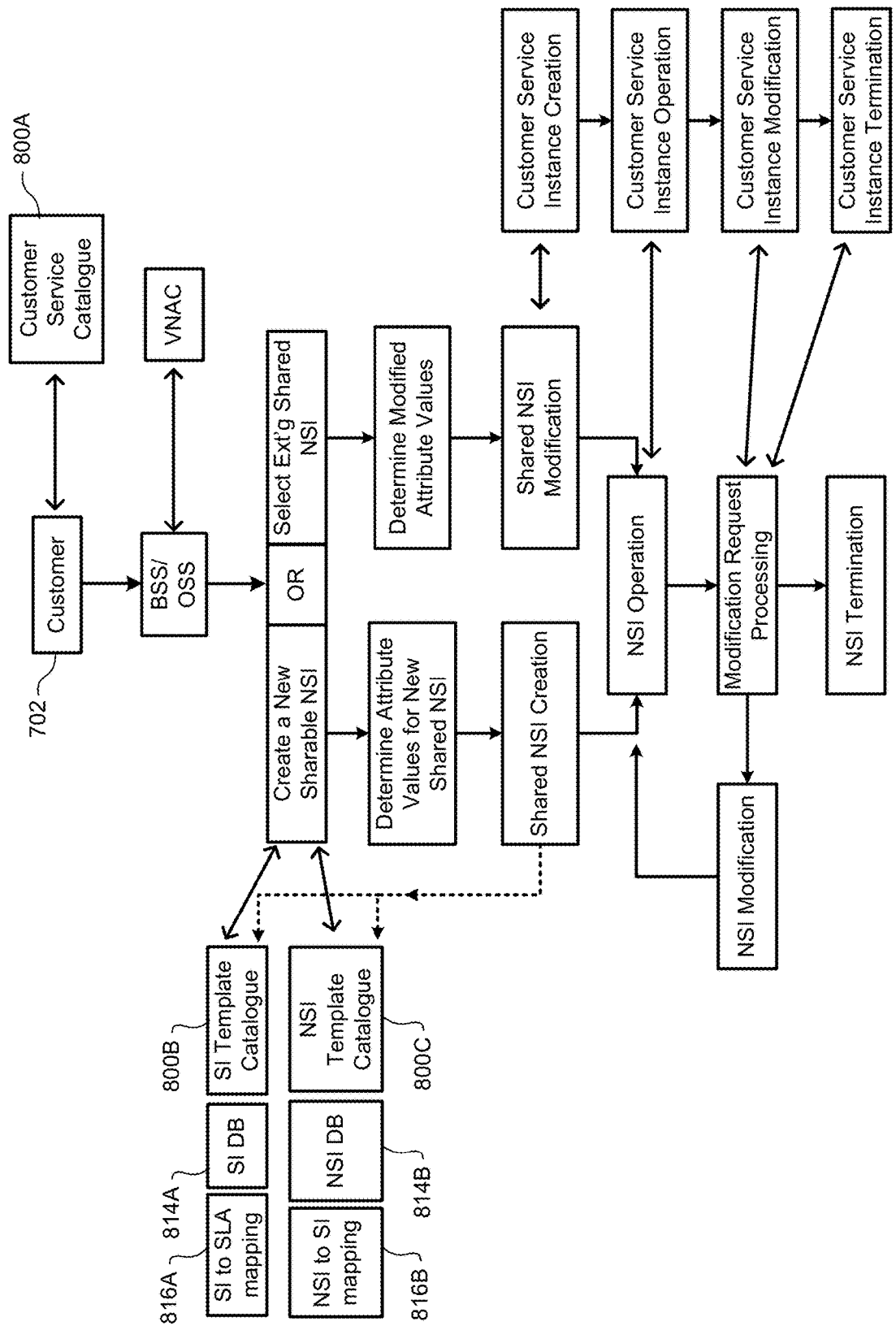
FIG. 9 is a flowchart showing an example process of creating a new customer service instance using a sharable NSI.

FIG. 9 is a flowchart showing an example process of creating a new customer service instance using a sharable NSI. As may be seen in FIG. FIG. 9, the customer interacts with the Customer Service Catalogue 800A to select a network service that suits its needs, and sends a request to the CSNF (optionally via a BSS/OSS) to negotiate an appropriate SLA. The CSNF may interact with the CSMF as well as the SI Template catalogue 800B and NSI Template catalogue 800C to determine whether an existing shared NSI can be used, or alternatively to create a new sharable NSI.

In a case in which it is decided to create a new sharable NSI, attribute values for the new NSI are determined in accordance with the service requirements, and the new NSI is created. The NSI template catalogue 800C, NSI database 814C, and NSI to SI mapping table 816C may then be updated as needed to reflect the new sharable NSI.

In a case in which it is decided to use an existing sharable NSI, modified attribute values (if any) needed to support the service requirements are determined, and the selected sharable NSI is modified accordingly.

Based on the creation of the new sharable NSI or the modification of the existing shared NSI, the customer service Instance can be created. During subsequent operation of the customer service, the service, may be monitored (for example by the SCMF and/or the customer) to determine whether or not it is meeting the customer's requirements. If needed, modifications to the Customer service instance may be determined and implemented. This operation may involve modifying parameters of the NSI. When the customer service is no longer required, a termination process may be used to terminate the customer service.

Similarly, during operation of the sharable NSI, the NSI, may be monitored (for example by the SCMF and/or the customer) to determine whether or not it is meeting the customer's requirements. If needed, modifications to the sharable NSI may be determined and implemented. This operation may involve modifying parameters of the customer service. When the customer service is no longer required, a termination process may be used to terminate the sharable NSI.

FIG. 10 is a table describing Generic QoS/QoE management methods monitoring and accounting. Note that in all cases, the customer may request for more resources or higher KPIs with higher charging to address overloading.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by modules or functional elements specific to those steps. The respective units/modules may be implemented as specialized hardware, software executed on a hardware platform that is comprised of general purpose hardware, or a combination thereof. For instance, one or more of the units/modules may be implemented as an integrated circuit, such as field programmable gate arrays (FPGAs) or application-specific integrated circuits (ASICs). It will be appreciated that where the modules are software, they may be stored in a memory and retrieved by a processor, in whole or part as needed, individually or together for processing, in single or multiple instances as required. The modules themselves may include instructions for further deployment and instantiation.

Based on the foregoing, it may be appreciated that embodiments of the present invention may provide:

A system for managing a network comprising an Operator Domain, the system comprising: a hierarchical system of management functions; and a respective service catalogue associated with each management function. The service catalogue storing information of services that can be provided by the management function to at least one higher level management function.

In some embodiments, the hierarchical system of management functions comprise any one or more of: a Customer Service Negotiation Function; a Customer Service Management Function; a Network Slice Management Function; a Network Slice Subnet Management Function; and an Element Manager.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A system comprising:
    at least one hardware processor;
    at least one non-transitory computer readable medium storing software instructions configured to control the at least one hardware processor to configure a management function to be associated with a particular layer of a hierarchical system of management functions associated with an operator network, and an exposure function,
    the management function configured to:
        implement at least one management service pertaining to a service instance in the operator network, wherein the service instance is to be provided to at least one other entity associated with an upper layer of the hierarchical system and the at least one management service is accessible by the at least one other entity, wherein the service instance is to be provided using a network slice instance (NSI), and wherein the at least one other entity comprises a second management function associated with the upper layer of the hierarchical system;
    and wherein the exposure function is configured to:
        maintain a catalogue storing information of the at least one management service, at least a portion of the catalogue being exposed to the at least one other entity, wherein the at least one management service comprises exposing one or more management functions to the at least one other entity such that the at least one other entity can at least partially manage the NSI in accordance with the exposed the one or more management functions, and wherein the information of the at least one management service stored in the catalogue comprises at least one template configured to define at least one of:
- a network slice subnet instance to satisfy a particular NSI;
- and a virtual network function to satisfy a network slice subnet instance; and receive another catalogue storing information of at least one another management service associated with a lower layer of the hierarchical system, at least a portion of the another catalogue being exposed to the particular layer of the hierarchical system;

and wherein the management function is further configured to:
- receive a request for the service instance from the at least one other entity;
- determine service capability of the at least one management service;
- determine feasibility of the service instance based on the determined service capability and the another catalogue, wherein the information in the another catalogue comprises capacity of the at least one management service provided by the lower layer, and wherein determining feasibility further comprises requesting the lower layer to reserve resources; and
- determine whether to accept the request based on the determined feasibility.

2. The system as claimed in claim 1, wherein the management function comprises any one of:
- a Customer Service Negotiation Function;
- a Customer Service Management Function;
- a Network Slice Management Function;
- a Network Slice Subnet Management Function; and
- an Element Manager.

3. The system as claimed in claim 1, wherein each template comprises any one or more of:
- one or more network function graphs for respective different service flows;
- QoS/QoE requirements;
- maximum resource requirements;
- accounting requirements; and
- exposure levels.

4. The system as claimed in claim 1, wherein the at least one other entity comprises a customer of the operator network;
wherein the information of the at least one management service stored in the catalogue comprises at least one template configured to define a service instance to satisfy a service level agreement negotiated between the customer and the operator network; and
wherein each template comprises information defining any one or more of:
- service type
- network Key Performance Indicators (KPI),
- application requirements,
- penalties,
- user/traffic demand distribution, and
- charging methods.

5. The system as claimed in claim 1, wherein the at least a portion of the another catalogue being exposed to the at least one other entity comprises:
- an available capacity of each service type supported by the at least one management service.

6. The system as claimed in claim 5, wherein the at least a portion of the catalogue being exposed to the at least one other entity further comprises one or more of:
- service types supported by the at least one management service;
- a cost of each service type supported by the at least one management service; and
- a resource usage of each service type supported by the at least one management service.

7. The system as claimed in claim 1, wherein the at least one other entity comprises a second management function associated with the operator network and a customer of the operator network, and wherein respective different portions of the catalogue are exposed to the second management function and the customer.

8. The system as claimed in claim 1, wherein the service instance comprises an E2E communication service, and wherein the at least one management service comprises management of a network slice supporting the E2E communication service.

9. The system as claimed in claim 1, wherein the service instance comprises one or more network functions, and wherein the at least one management service comprises exposing one or more management functions to a customer of the operator network such that the customer can at least partially manage the one or more network functions in accordance with the exposed one or more management functions.

10. The system as claimed in claim 1, wherein the upper layer of the hierarchical system is associated with a Communication Service Customer (CSC) and the particular layer of the hierarchical system is associated with a Customer Slice Provider (CSP), wherein the service instance is used by the CSC to provide a communication service to one or more end users of the CSC.

11. The system as claimed in claim 1, wherein the upper layer of the hierarchical system is associated with a Network Slice Subnet Instance (NSSI) customer and the particular layer of the hierarchical system is associated with an NSSI provider, wherein the service instance is a network slice subnet instance provided to the NSSI customer.

12. The system as claimed in claim 1, wherein the upper layer of the hierarchical system is associated with a Network Slice Instance (NSI) customer and the particular layer of the hierarchical system is associated with an NSI provider, wherein the service instance is a network slice instance provided to the NSI customer.

13. The system as claimed in claim 1, wherein the instructions when executed by the processor further cause the management function to be configured to:
- provide limited network management capabilities to the at least one other entity by exposing one or more other management functions associated with the particular layer of the hierarchical system through a Slice Management Exposure Function (SMEF).

14. The system of claim 1 wherein:
- the information in the another catalogue comprises capacity of at least one management service provided by the lower layer; and
- determining feasibility further comprises requesting the lower layer to reserve the resources.

15. The system of claim 1 wherein the at least one other entity is a customer.

16. The system of claim 15 wherein the information of the at least one management service stored in the catalogue comprises at least one template configured to define a service instance to satisfy a service level agreement negotiated between the customer and the operator network.

17. The system of claim 15 wherein determine feasibility of the service instance based on the determined service capability and the another catalogue comprises determining the feasibility of the service instance to satisfy a service level agreement negotiated between the customer and the operator network.

18. The system of claim 1 wherein the information in the another catalogue comprises capacity of at least one management service provided by the lower layer and determining feasibility further comprises requesting the lower layer to reserve the resources.

19. The system of claim 1, wherein the information of the at least one management service stored in the catalogue further comprises at least one template configured to define the NSI to satisfy a particular customer service instance comprising at least one end-to-end (E2E) communication service.

20. A management function comprising:
at least one hardware processor;
a non-transitory computer readable medium storing software instructions configured to control the at least one hardware processor to configure the management function to be associated with a particular layer of a hierarchical system of management functions associated with an operator network, and exposure function,
the management function configured to:
implement at least one management service pertaining to a service instance in the operator network, wherein the service instance is to be provided to at least one other entity associated with an upper layer of the hierarchical system and the at least one management service is accessible by the at least one other entity, wherein the service instance is to be provided using a network slice instance (NSI), and wherein the at least one other entity comprises a second management function associated with the upper layer of the hierarchical system;
and wherein the exposure function is configured to:
maintain a catalogue storing information of the at least one management service, at least a portion of the catalogue being exposed to the at least one other entity, wherein the at least one management service comprises exposing one or more management functions to the at least one other entity such that the at least one other entity can at least partially manage the NSI in accordance with the exposed the one or more management functions,
and wherein the information of the at least one management service stored in the catalogue comprises at least one template configured to define at least one of:
a network slice subnet instance to satisfy a particular NSI;
and a virtual network function to satisfy a network slice subnet instance; and
receive another catalogue storing information of at least one another management service associated with a lower layer of the hierarchical system, at least a portion of the another catalogue being exposed to the particular layer of the hierarchical system;
and wherein the management function is further configured to:
receive a request for the service instance from the at least one other entity;
determine service capability of the at least one management service;
determine feasibility of the service instance based on the determined service capability and the another catalogue, wherein the information in the another catalogue comprises capacity of the at least one management service provided by the lower layer, and wherein determining feasibility further comprises requesting the lower layer to reserve resources; and
determine whether to accept the request based on the determined feasibility.

21. The management function of claim 20, wherein the information of the at least one management service stored in the catalogue further comprises at least one template configured to define the NSI to satisfy a particular customer service instance comprising at least one end-to-end (E2E) communication service.

22. A system for managing operator network, comprising:
at least one hardware processor;
a hierarchical system of one or more management functions; and
one or more service catalogues respectively associated with each of the one or more management functions,
wherein each of the one or more management functions is associated with a particular layer of the hierarchical system, and an exposure function, and the management function is configured to:
implement at least one management service pertaining to a service instance in the operator network, the service instance being provided to at least one other entity associated with an upper layer of the hierarchical system and the at least one management service being accessible by the at least one other entity, wherein the service instance is to be provided using a network slice instance (NSI), and wherein the at least one other entity comprises a second management function associated with the upper layer of the hierarchical system;
and wherein the exposure function is configured to:
maintain the respective service catalogue, the respective service catalogue storing information of the at least one management service, at least a portion of the service catalogues being exposed to the at least one other entity, wherein the at least one management service comprises exposing one or more management functions to the at least one other entity such that the at least one other entity can at least partially manage the NSI in accordance with the exposed the one or more management functions; and
receive another catalogue storing information of at least one another management service associated with a lower layer of the hierarchical system, at least a portion of the another catalogue being exposed to the particular layer of the hierarchical system
wherein the information of the at least one management service stored in the catalogue comprises at least one template configured to define at least one of:
a network slice subnet instance to satisfy a particular NSI;
and a virtual network function to satisfy a network slice subnet instance
and wherein at least one of the one or more management functions is further configured to:

receive a request for the service instance from the at least one other entity;

determine service capability of the at least one management service;

determine feasibility of the service instance based on the determined service capability and the another catalogue, wherein the information in the another catalogue comprises capacity of the at least one management service provided by the lower layer, and wherein determining feasibility further comprises requesting the lower layer to reserve resources; and determine whether to accept the request based on the determined feasibility.

23. The system for managing operator network of claim 22, wherein the information of the at least one management service stored in the catalogue further comprises at least one template configured to define the NSI to satisfy a particular customer service instance comprising at least one end-to-end (E2E) communication service.

* * * * *